US007065379B1

(12) United States Patent
Kim et al.

(10) Patent No.: US 7,065,379 B1
(45) Date of Patent: Jun. 20, 2006

(54) PORTABLE RADIO TERMINAL EQUIPMENT HAVING CONDUCTOR FOR PREVENTING RADIATION LOSS

(75) Inventors: Kyeong-Jun Kim, Ichonkwangyok-shi (KR); Jong-Goo Kim, Yongin-shi (KR); Young-Ju Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 519 days.

(21) Appl. No.: 09/607,789

(22) Filed: Jun. 30, 2000

(30) Foreign Application Priority Data

Jul. 2, 1999 (KR) ................................ 1999/26672
Sep. 10, 1999 (KR) ................................ 1999/38777

(51) Int. Cl.
*H04B 1/38* (2006.01)

(52) U.S. Cl. ................................ 455/550.1; 455/575.5; 455/90.3; 455/575.7; 343/841; 343/845; 343/849

(58) Field of Classification Search ............... 455/90.3, 455/562.1, 550.1, 575.7, 575.1, 348, 561, 455/347, 346, 575.3, 344, 128, 129, 575.5, 455/425, 424, 13.3, 63.1, 575.4, 301, 334, 455/217, 117; 343/7.54, 700, 702, 880, 872, 343/900, 915, 725, 726, 833, 834, 895, 901, 343/846, 7.5, 715, 770, 841, 829, 853, 852, 343/751, 750, 749, 768, 792, 851, 845, 849
See application file for complete search history.

(56) References Cited

U.S. PATENT DOCUMENTS

| | | | | |
|---|---|---|---|---|
| 4,868,576 | A * | 9/1989 | Johnson, Jr. | 343/702 |
| 5,262,792 | A * | 11/1993 | Egashira | 343/702 |
| 5,337,061 | A * | 8/1994 | Pye et al. | 343/702 |
| 5,408,699 | A * | 4/1995 | Yamashita et al. | 455/274 |
| 5,554,996 | A * | 9/1996 | Chatzipetros | 343/702 |
| 5,572,223 | A * | 11/1996 | Phillips et al. | 343/702 |
| 5,585,807 | A * | 12/1996 | Takei | 343/702 |
| 5,661,495 | A * | 8/1997 | Saldell | 343/702 |
| 6,421,016 | B1 * | 7/2002 | Phillips et al. | 343/702 |
| 6,615,026 | B1 * | 9/2003 | Wong | 455/575.5 |

* cited by examiner

*Primary Examiner*—Edward F. Urban
*Assistant Examiner*—Charles Chow
(74) *Attorney, Agent, or Firm*—Dilworth & Barrese LLP

(57) ABSTRACT

A portable radio terminal where the total length of a terminal body and an antenna is less than ½ wavelength. The terminal equipment includes a conductor connected to a printed circuit board in the terminal body so that an electrical equivalent length is ½ wavelength. The portable radio terminal equipment maintains a good radiation efficiency, while reducing the total size of a body and an antenna of the terminal equipment.

10 Claims, 15 Drawing Sheets

PORTABLE RADIO TERMINAL EQUIPMENT HAVING CONDUCTOR FOR PREVENTING RADIATION LOSS

PRIORITY

This application claims priority to an application entitled "Portable Radio Terminal Equipment Having Conductor for Preventing Radiation Loss" filed in the Korean Industrial Property Office on Jul. 2, 1999 and assigned Serial No. 99-26672, and an application filed in the Korean Industrial Property Office on Sep. 10, 1999 and assigned Serial No. 99-38777 the contents of both of which are hereby incorporated by reference.

BACKGROUND OF THE INVENTION

1. Field of the Invention

The present invention relates generally to portable radio terminal equipment, and in particular, to compact, lightweight portable radio terminal equipment with a better radiation efficiency to thereby reduce harm to human bodies caused by radiation.

2. Description of the Related Art

There is a trend in mobile communication technology to provide increasingly more compact, lightweight radio terminal equipment in accordance with user preference. In general, the length of existing portable radio terminal equipment does not exceed $\lambda/4$, where $\lambda$ represents the received electromagnetic wavelength corresponding to the operating frequency. Since portable radio terminal equipment uses electromagnetic waves for communication, a radiation efficiency is an important factor in increasing call quality.

FIG. 1A is a front view of a conventional portable radio terminal having a conductive printed circuit board (PCB), and FIG. 1B is a side view of the conventional potable radio terminal.

Referring to FIGS. 1A and 1B, a dipole antenna 100 uses a body 120 as a ground. The dipole antenna 100 has an efficiency and a radiation pattern, which varies according to its length. The dipole antenna 100 radiates the maximum signal when the length is $\lambda/2$, and incurs a radiation loss when the length is below $\lambda/2$.

FIG. 2 illustrates the distribution of a radiation current when the total length of the body and the antenna of the portable radio terminal is below $\lambda/2$. In FIG. 2, the total length of the body and the antenna is $\lambda/2-a$. As shown, the equivalent circuit and the radiation current distribution includes a radiation loss, as represented by a dotted line.

FIG. 3 illustrates the distribution of a radiation current when the total length of the body and the antenna of the portable radio terminal is $\lambda/2$. The total length of the body and the antenna is $\lambda/2$, thus the equivalent circuit and the radiation current distribution includes no radiation loss.

In contrasting the radiation current distribution of FIGS. 2 and 3, it is evident that a radiation loss occurs when the total length of the body and the antenna is below $\lambda/2$, whereas the radiation loss does not occur when the total length is $\lambda/2$. However, this factor places a limitation on the compactness of the portable radio terminal, which is contrary to the current user preference.

Therefore, a technique capable of maintaining a good radiation efficiency, while reducing the total size of the body and the antenna to $\lambda/2$ and below is needed.

SUMMARY OF THE INVENTION

It is, therefore, an object of the present invention to provide portable radio terminal equipment which can maintain a good radiation efficiency, while reducing the total size of a body and an antenna of the terminal equipment to $\lambda/2$ and below.

It is another object of the present invention to provide portable radio terminal equipment which reduces the harmfulness to a human body resulting from electromagnetic waves being applied to the user's head, while reducing the total size of a body and an antenna of the terminal equipment to $\lambda/2$ or less.

In accordance with one aspect of the present invention, portable radio terminal equipment has a total length, including a terminal body and an antenna, of below ½ wavelength. The terminal equipment includes a conductor connected to a printed circuit board in the terminal body so that an electrical equivalent length is ½ wavelength.

In accordance with another aspect of the present invention, portable radio terminal equipment with a flip includes a conductor within the flip so that an equivalent ground length formed by a terminal body and the flip is longer than ¼ wavelength in order to disperse a peak current distribution point.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1A:
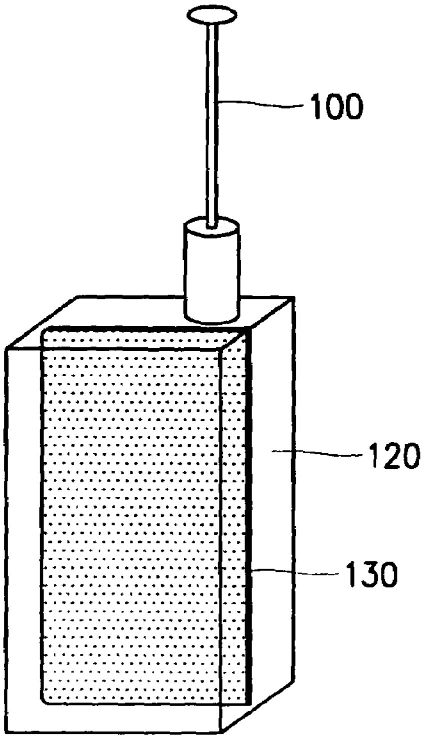
FIG. 1A is a front view of conventional portable radio terminal equipment having a conductive PCB.
Figure 1B:
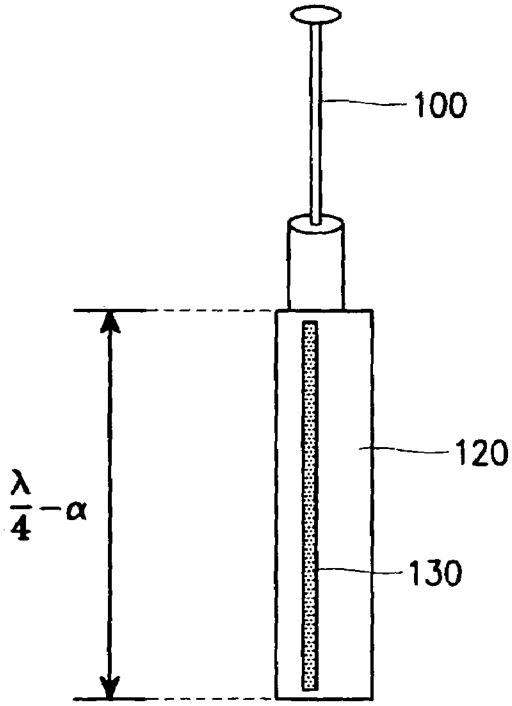
FIG. 1B is a side view of the conventional portable radio terminal equipment having a conductive PCB.
Figure 2:
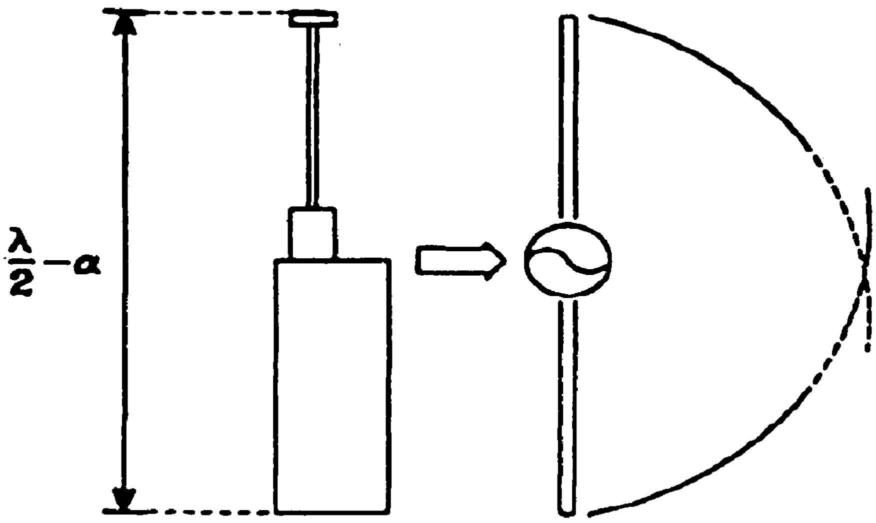
FIG. 2 PRIOR ART
FIG. 2 is a diagram illustrating distribution of a radiation current when the total length of a body and an antenna of a portable radio terminal equipment is below $\lambda/2$.
Figure 3:
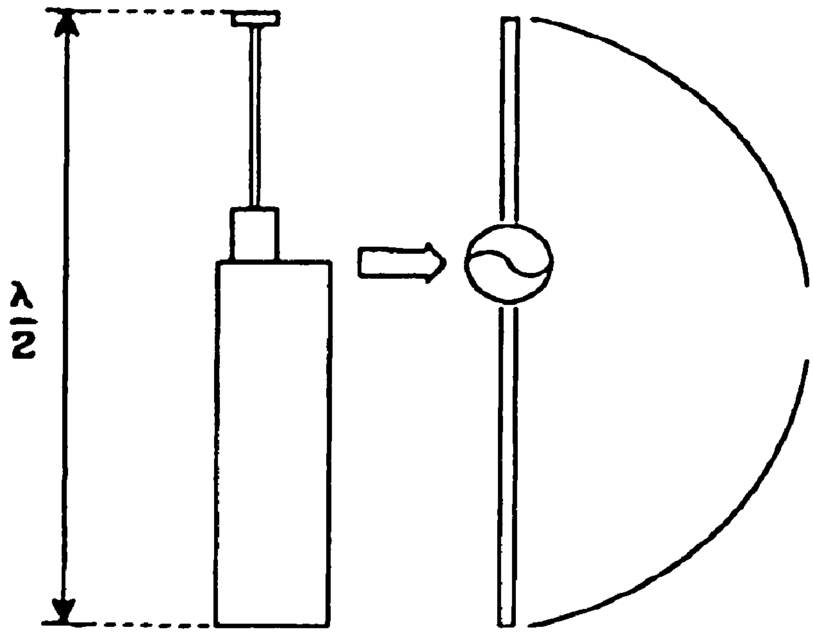
FIG. 3 PRIOR ART
FIG. 3 is a diagram illustrating distribution of a radiation current when the total length of a body and an antenna of a portable radio terminal equipment is $\lambda/2$.
Figure 4A:
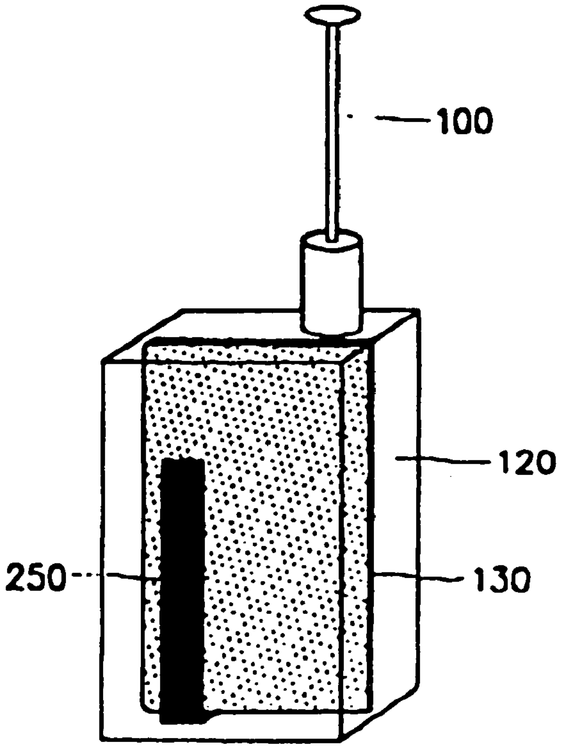
FIG. 4A is a front view of portable radio terminal equipment having a conductor according to an embodiment of the present invention.
Figure 4B:
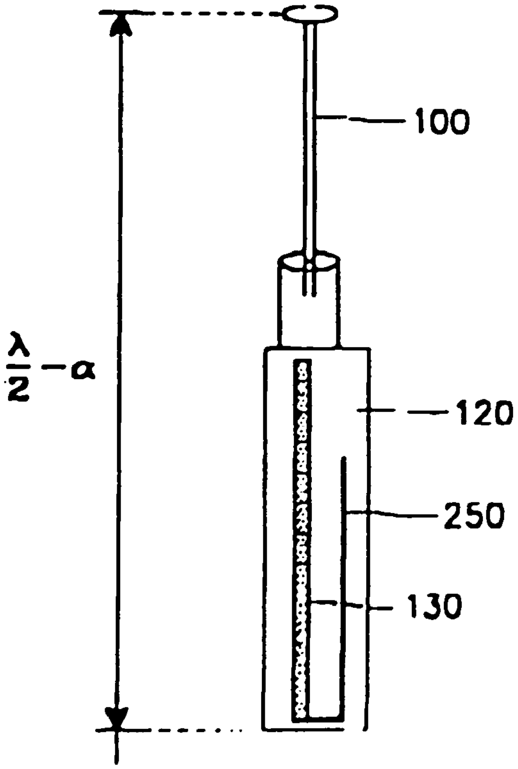
FIG. 4B is a side view of the portable radio terminal equipment having a conductor according to an embodiment of the present invention.

FIG. 4A is a front view of portable radio terminal equipment having a conductor according to an embodiment of the present invention, and FIG. 4B is a side view of the portable radio terminal equipment having a conductor according to an embodiment of the present invention. Referring to FIGS. 4A and 4B, a conductor 250 is connected to the bottom of a conductive PCB 130 in a terminal body 120. In case of high frequency, the conductor is electrically connected to the antenna, directly or via components on the PC board.

Figure 5:
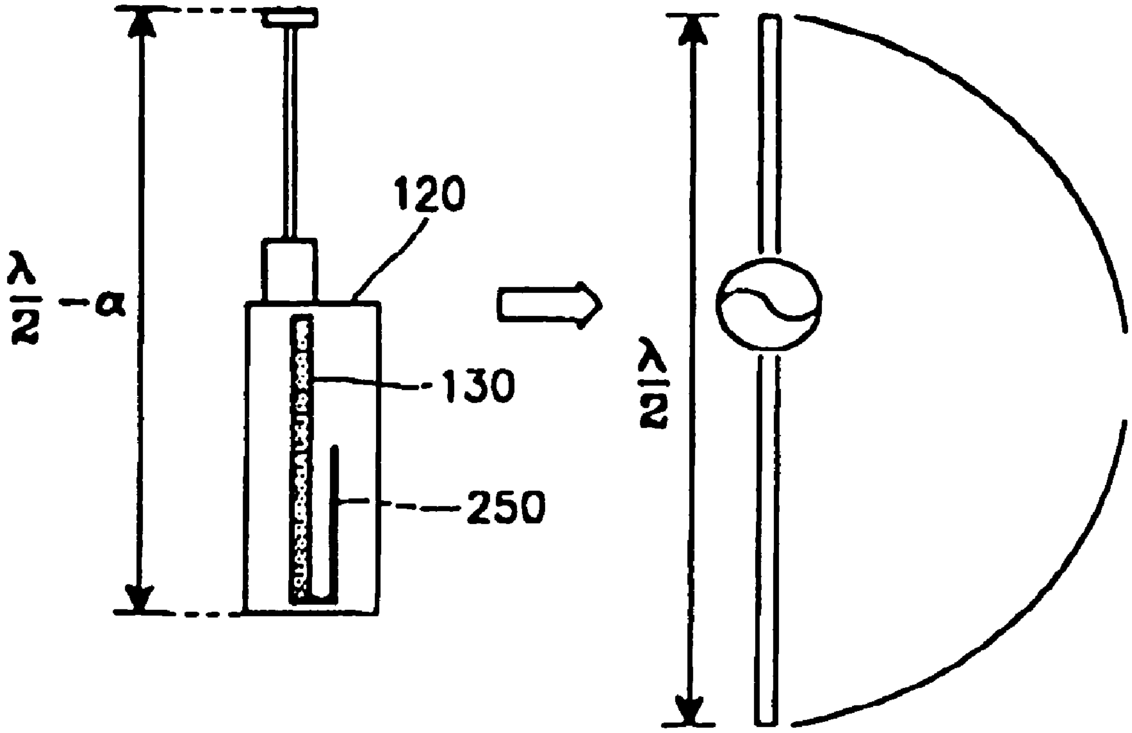
FIG. 5 is a diagram illustrating radiation current distribution of the portable radio terminal equipment having a conductor according to an embodiment of the present invention.

FIG. 5 illustrates the radiation current distribution of the portable radio terminal equipment having a conductor according to an embodiment of the present invention. Referring to FIG. 5, the portable radio terminal equipment is shown, where the total length of the body and the antenna of the terminal equipment is λ/2−α. Also shown is the equivalent circuit and radiation current distribution. As illustrated, although the total length of the body and the antenna of the terminal equipment is less than λ/2, the maximum current is radiated without radiation loss. This is because the conductor 250 is connected to the bottom of the conductive PCB 130 in the terminal body 120. In other words, even though the total length of the terminal body 120 and the antenna 100 is actually less than λ/2, its electrical length becomes λ/2 by connecting the conductor 250 to the conductive PCB 130.

FIGS. 6 to 9 show the portable radio terminal equipment according to various embodiments of the present invention, in which the conductors have different shapes corresponding to the various embodiments.

Figure 6:
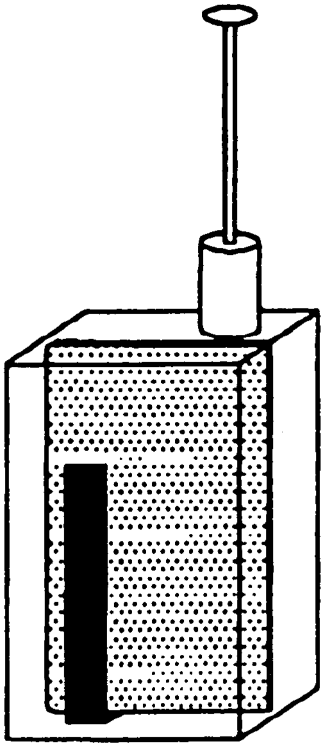
FIGS. 6 to 9 are diagrams illustrating the portable radio terminal equipment with conductors having different shapes according to various embodiments of the present invention.
Figure 7:
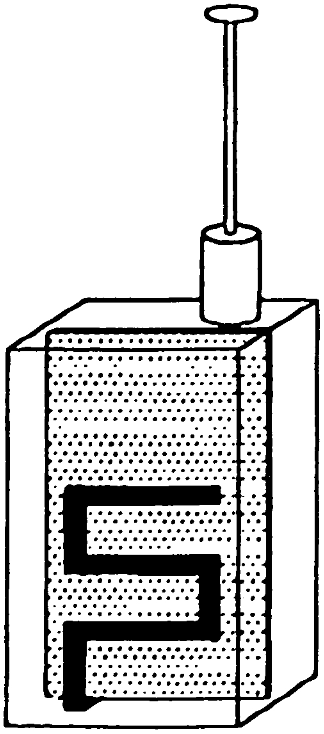
Figure 8:
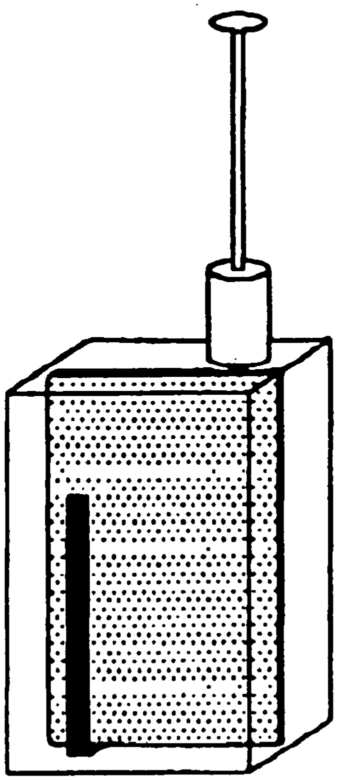
Figure 9:
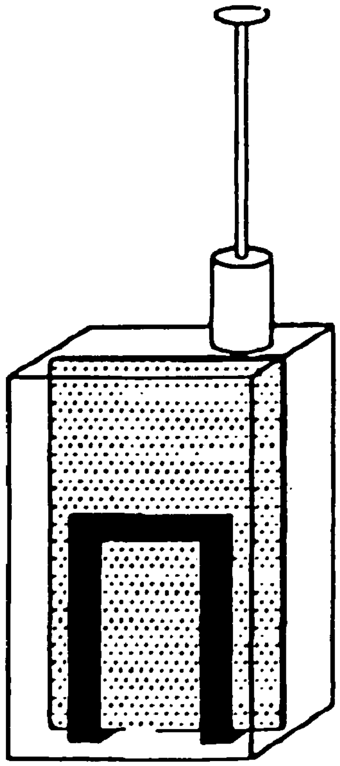

More specifically, FIG. 6 illustrates portable radio terminal equipment having a conductor in the form of a wide flat conductor board, and FIG. 7 illustrates portable radio terminal equipment having a conductor comprised of a strip line arrangement. Further, FIG. 8 illustrates portable radio terminal equipment having a conductor extending in a straight line, and FIG. 9 illustrates portable radio terminal equipment having a conductor in the form of a closed loop. The conductors may be in contact with the PCB over their whole length, or may not.

The portable radio terminal equipment uses electromagnetic waves for communication. Since the user brings the portable radio terminal equipment into close contact with his or her head during a call, the user may suffer from the harmful electromagnetic waves. Recently, every nation has fixed an SAR (Specific Absorption Rate, of which a measuring unit is W/Kg) safety standard. The SAR is one of the factors considered in determining the level of harm to the human body posed by the electromagnetic waves from the portable radio terminal equipment.

For example, the ANSI(C95.1)/IEEE/FCC(P.24) safety standard restricts the average SAR to 0.08 W/Kg in an environment where an individual is typically unaware of the electromagnetic waves and an exposure to the electromagnetic waves cannot be controlled, and restricts the maximum SAR in any case to 1.6 W/Kg.

There is a trend in the development of mobile communication equipment to provide portable radio terminal equipment that is increasingly more compact and lightweight, in order to satisfy consumers' preferences. This, however, reduces the distance between an earpiece and a mouthpiece of the terminal equipment, to less than a distance between an ear and a mouth of the user. Thus, to solve this problem, a flip structure is typically utilized for the portable radio terminal equipment. Accordingly, portable radio terminal equipment will commonly include a non-conductive plastic flip.

Figure 10:
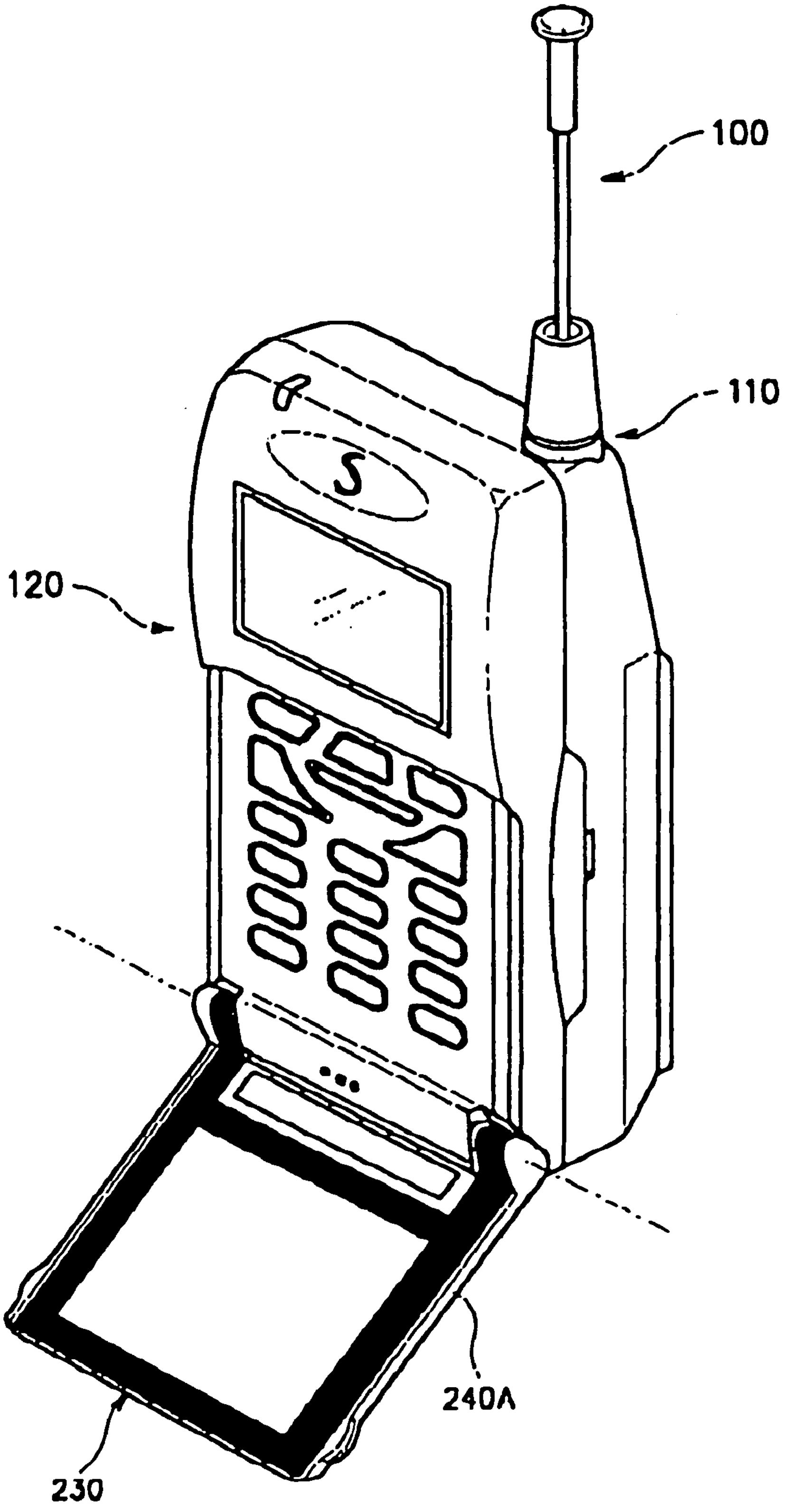
FIG. 10 is a diagram illustrating a portable radio terminal equipment having a flip with an integral conductor according to an embodiment of the present invention.
Figure 11:
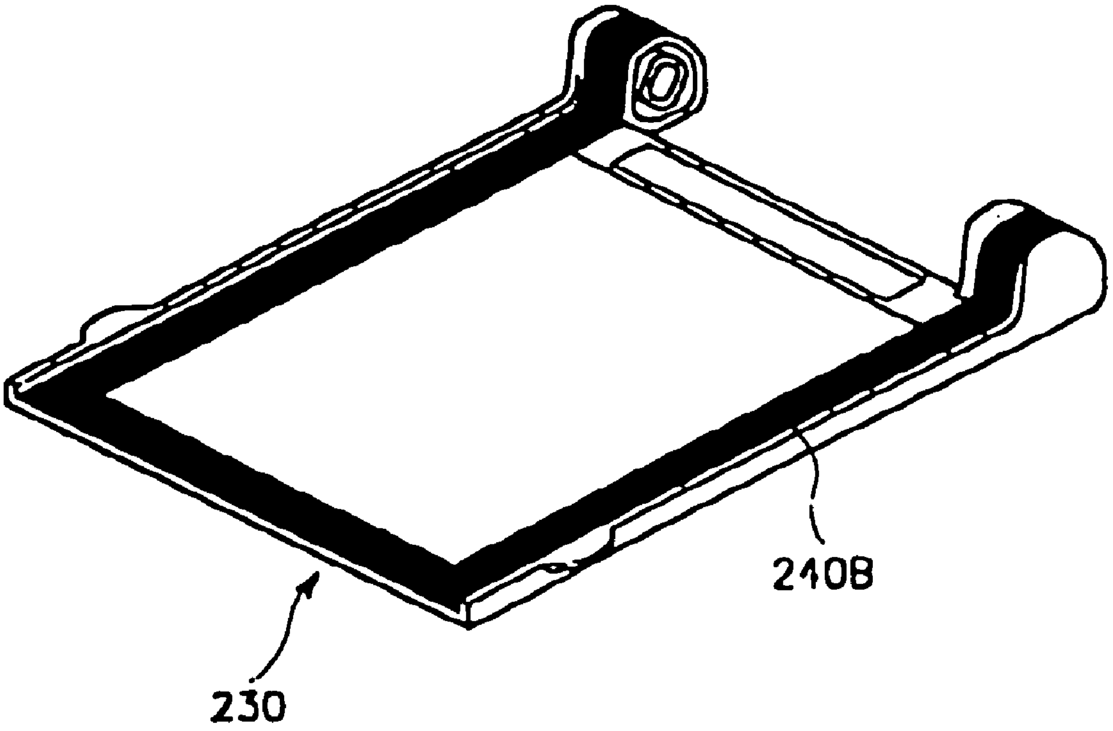
FIGS. 11 to 15 are diagrams illustrating the flips with integral conductors having different shapes according to various embodiments of the present invention.
Figure 12:
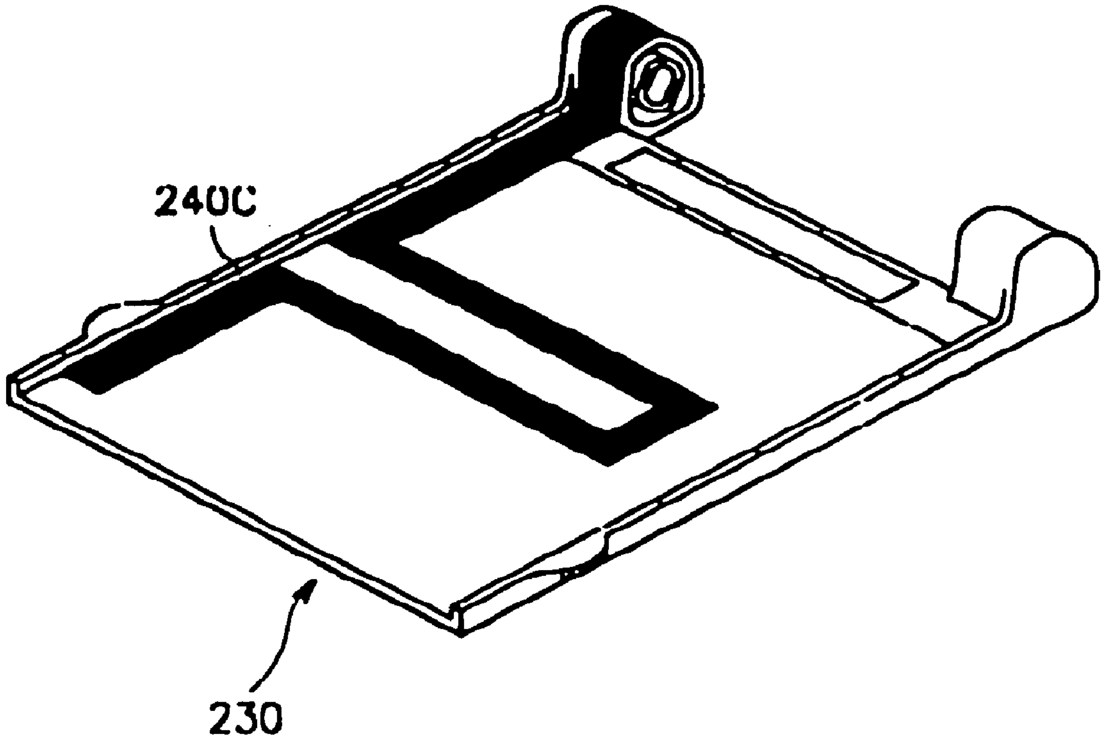
Figure 13:
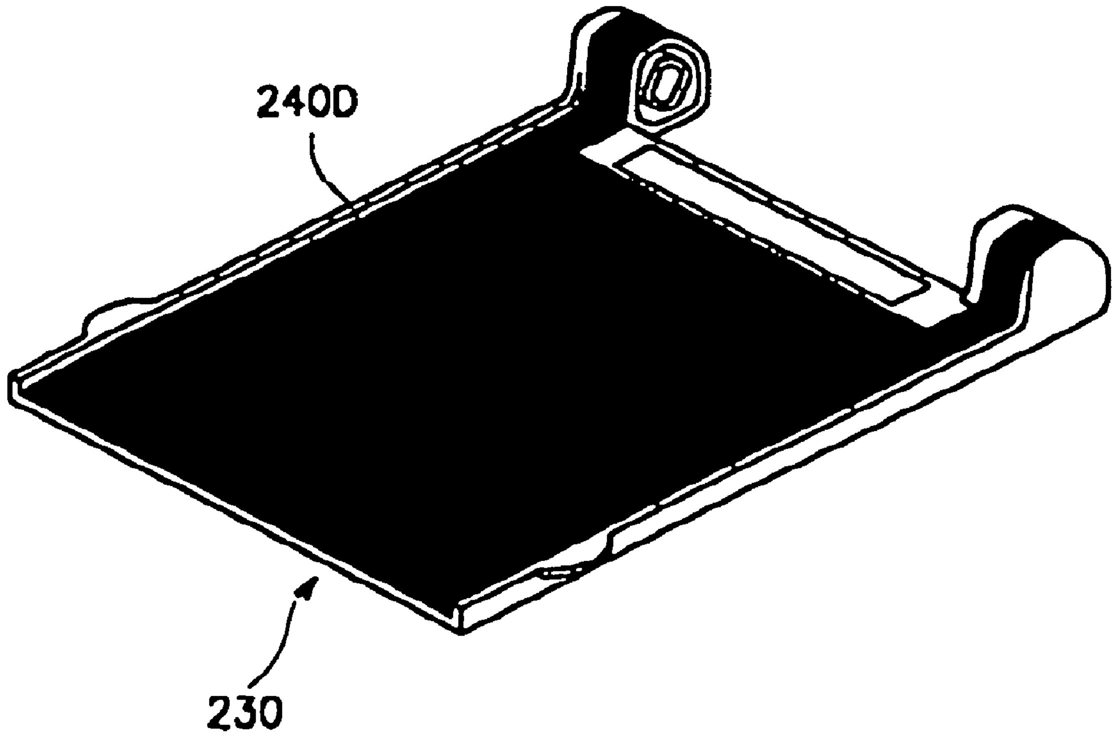
Figure 14:
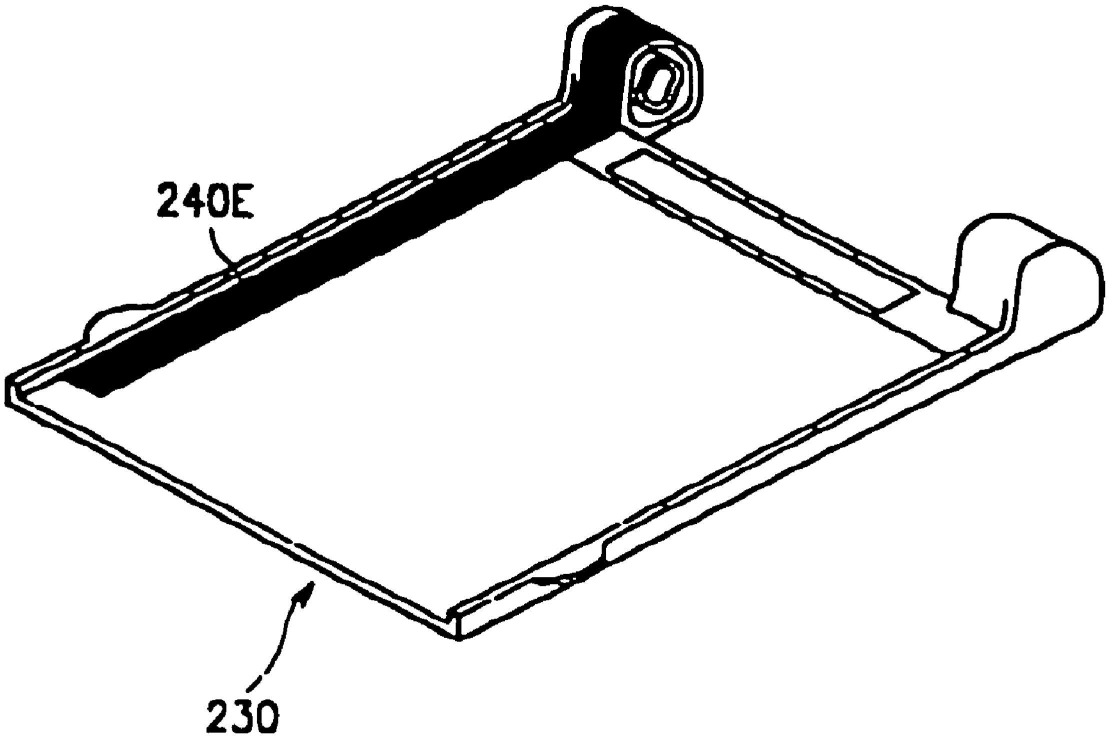
Figure 15:
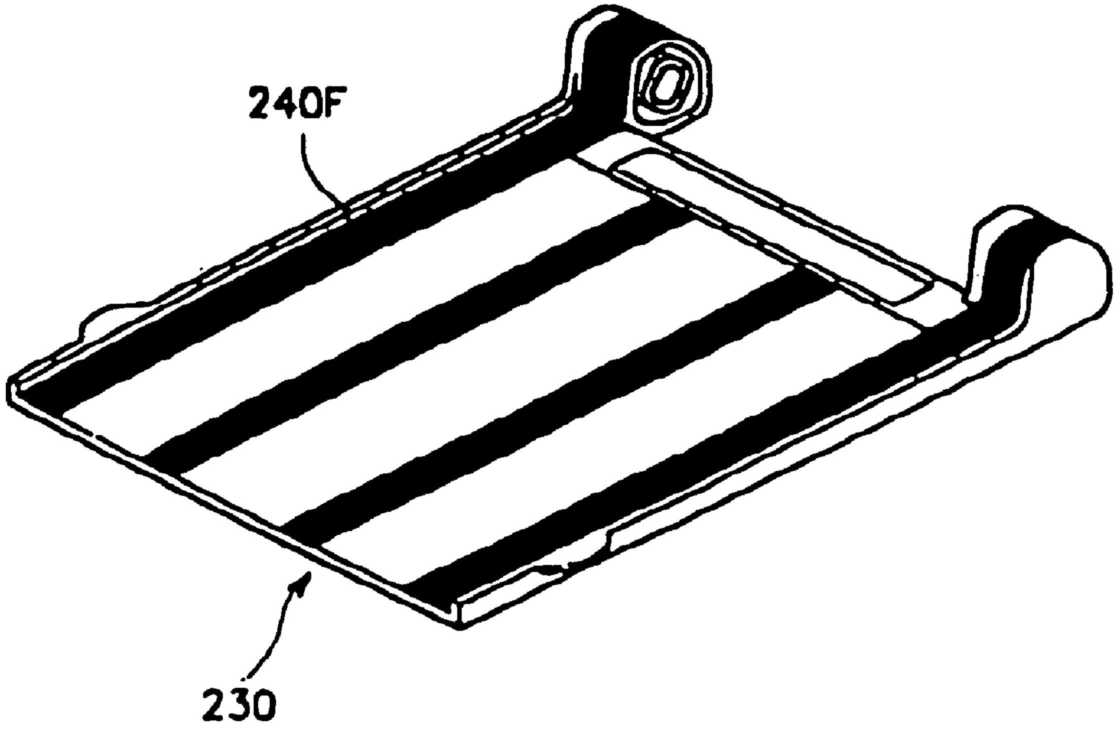

Referring to FIG. 10, an example of a novel portable radio terminal equipment with such a configuration is illustrated. The antenna 100 uses the terminal body 120 as a ground. Unlike an ideal monopole antenna where every ground surface has the same potential, this ground has a varying potential, where the potential varies according to positions on the body 120. In this context, the antenna 100 can be analyzed as an unbalanced dipole antenna. The length of the terminal body 120 tends to be miniaturized from λ/2 to λ/4. The reduction in length of the terminal equipment increases the maximum current distribution at a close range. When the length of the terminal body 120 is λ/4, the current distribution becomes maximum at a feeding point 110, which is detrimentally positioned, causing harm to a users head. Therefore, as illustrated, the novel portable radio terminal equipment has a flip, in which a conductor is included so as to increase the length to λ/2 and thereby reduce resulting harmfulness to the human body due to the electromagnetic waves.

FIGS. 11 to 15 illustrate the flips with differently-shaped conductors, in which reference numerals 240B to 240E indicate a conductive metal layer. Therefore, in the portable radio terminal equipment with the flip 230 which includes a conductor 240B to 240E electrically connected to the terminal body 120, an equivalent ground length formed by the terminal body 120 and the flip 230 becomes longer than λ/4 by using the conductor. The conductor may be formed on the flip by covering the flip with conductive pigments, or by performing injection molding after inserting a conductive substance. Alternatively, a conductive sticker may be attached to the flip. The conductor may be formed in the shape of a line or a flat board, and the shapes can vary according to the mechanical requirements of the terminal body, as illustrated in FIGS. 11 to 15.

Figure 16A:
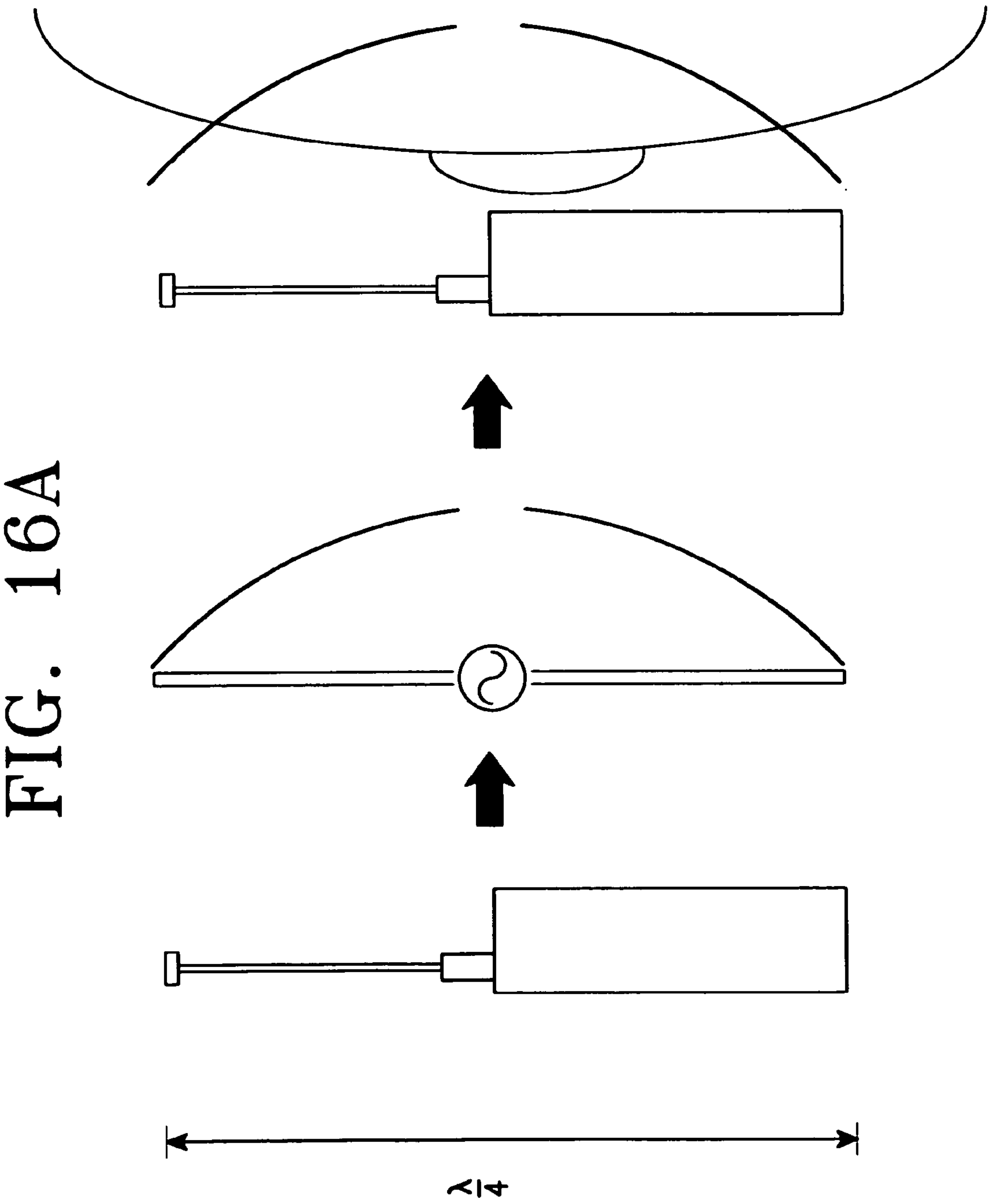
FIG. 16A is a diagram illustrating terminal equipment for which the total length of the body and the antenna is $\lambda/4$, together with the equivalent current distribution and actual current distribution.

FIG. 16A illustrates terminal equipment for which the total length of the body and the antenna is λ/4, together with the equivalent current distribution and actual current distribution. As illustrated, when the total length of the terminal equipment is λ/4, the peak current distribution occurs at the feeding point 110, so that the user's head may be greatly influenced by the electromagnetic waves.

Figure 16B:
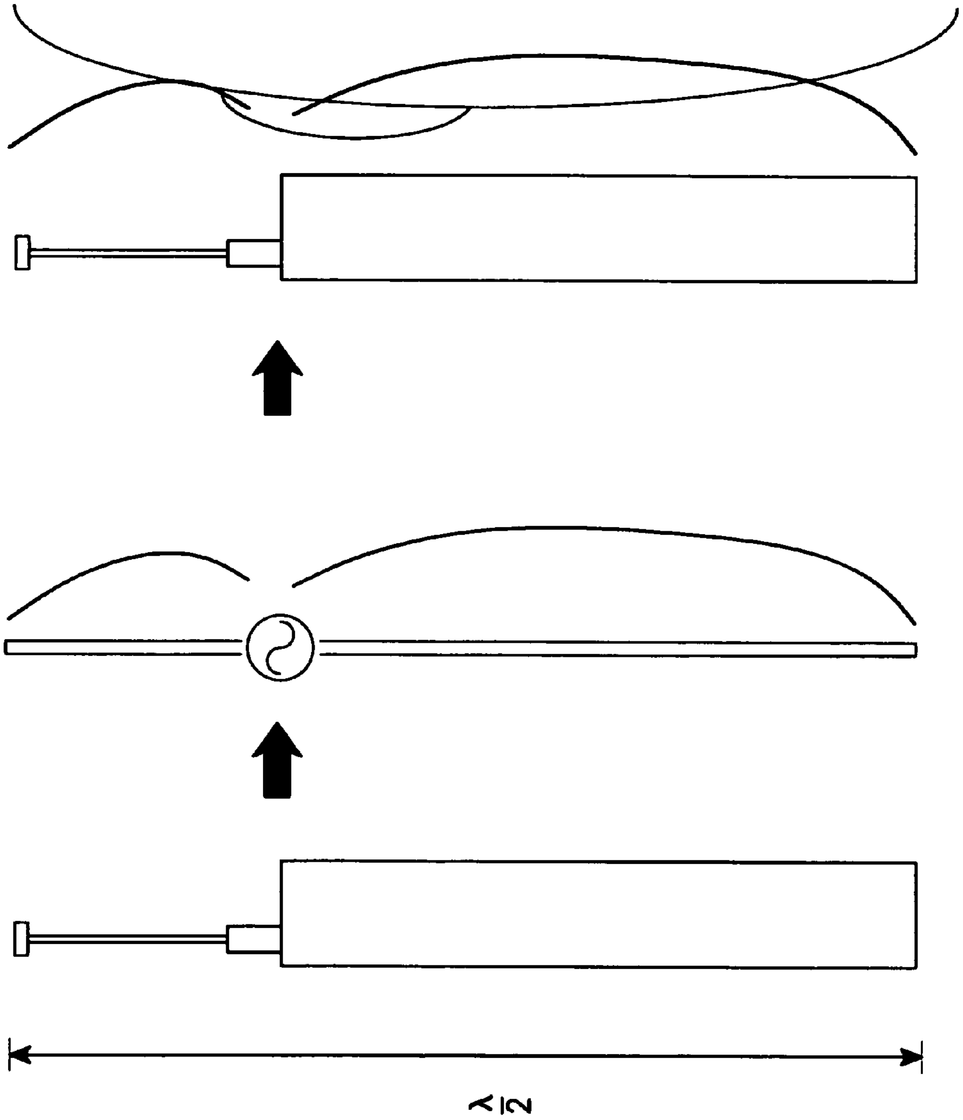
FIG. 16B is a diagram illustrating a terminal equipment for which the total length of the body and the antenna is λ/2, together with the equivalent current distribution and actual current distribution.

FIG. 16B shows terminal equipment for which the total length of the body and the antenna is λ/2, together with the equivalent current distribution and actual current distribution. Unlike in FIG. 16A, the maximum current distribution point disperses in two locations emanating from the feeding point 110, thereby reducing the peak magnitude. Therefore, the terminal equipment of FIG. 16B is less harmful to the human body, as compared with the terminal equipment of FIG. 16A. The approximate ratio of the peak magnitude of each of the current distributions of FIGS. 16B and 16C (λ/2) to the peak magnitude of the current distributions of FIG. 16A (λ/4) is ½.

Figure 16C:
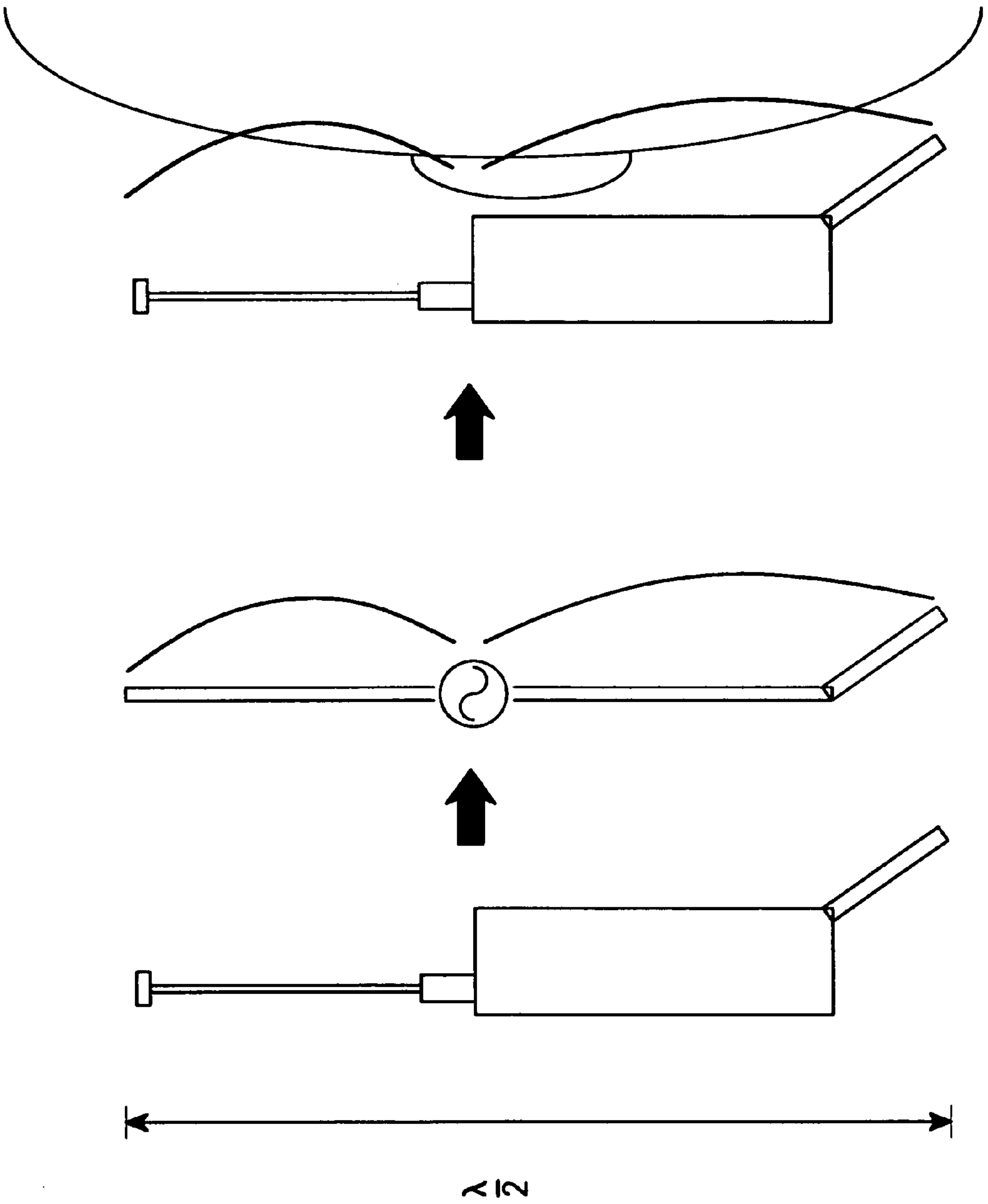
FIG. 16C is a diagram illustrating the portable radio terminal equipment having a folder with a conductor according to another embodiment of the present invention, for which an equivalent length of the body, the antenna and the folder is λ/2, together with the equivalent current distribution and actual current distribution.

FIG. 16C shows the portable radio terminal equipment having a folder with a conductor according to an embodiment of the present invention, for which an equivalent length of the body, the antenna and the flip is extended to λ/2, together with the equivalent current distribution and actual current distribution. As illustrated, the peak current distribution points disperse, reducing their peak magnitude, by increasing the equivalent ground length formed by the terminal body and the flip (more specifically, the conductor) to be longer than λ/4. Ideally, the equivalent ground length is λ/2.

In summary, in order to increase the equivalent ground length formed by the terminal body and the flip to be longer than λ/4, a conductor is included in the flip of the portable mobile terminal equipment, so that the short-distance current density peak magnitude may be reduced in the vicinity of the user's head. In this manner, it is possible to minimize the influence of the electromagnetic waves upon the human body. Therefore, it is possible to provide portable radio terminal equipment which can maintain good radiation efficiency, while reducing the total size of the body and antenna of the terminal equipment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable radio terminal apparatus including a terminal body and an antenna wherein said portable radio terminal's overall length is less than ½ wavelength, the portable radio terminal comprising:

a conductor connected to a printed circuit board disposed within the terminal body such that an electrical equivalent length of the portable radio terminal is ½ wavelength, thereby shifting a peak current distribution point and reducing the peak current radiated from the peak current distribution point, wherein the magnitude of electromagnetic radiation emitted from the peak current distribution point in the vicinity of the terminal body is minimized so that the pattern of the emitted electromagnetic waveform adjacent to the terminal is reshaped in such a way so as to reduce the influence of electromagnetic waves upon a user's head.

2. The portable radio terminal apparatus as claimed in claim 1, wherein the conductor comprises a flat conductive board.

3. The portable radio terminal apparatus as claimed in claim 1, wherein the conductor comprises a strip line.

4. The portable radio terminal apparatus as claimed in claim 1, wherein the conductor extends in a straight line from the printed circuit board.

5. The portable radio terminal apparatus as claimed in claim 1, wherein the conductor comprises a closed loop.

6. A portable radio terminal apparatus including a terminal body having a flip and an antenna, said portable radio terminal comprising:

a conductor integrated with the flip so that an equivalent ground length formed by the terminal body, the antenna and the flip is longer than ¼ wavelength, thereby shifting a peak current distribution point and reducing the peak current radiated from the peak current distribution point, wherein the magnitude of electromagnetic radiation emitted from the peak current distribution point in the vicinity of the terminal body is minimized so that the pattern of the emitted electromagnetic waveform adjacent to the terminal is reshaped in such a way so as to reduce the influence of electromagnetic waves upon a user's head.

7. The portable radio terminal apparatus as claimed in claim 6, wherein the conductor is formed within the flip by inserting a conductive substance.

8. The portable radio terminal apparatus as claimed in claim 6, wherein the conductor is formed on the flip by applying conductive pigments to the flip.

9. The portable radio terminal apparatus as claimed in claim 6, wherein the conductor is a conductive sticker attached to the flip.

10. A portable radio terminal apparatus including a terminal body having a flip and an antenna, said portable radio terminal comprising:

a conductor integrated with the flip so that an equivalent ground length formed by the terminal body, the antenna and the flip is ½ wavelength, thereby shifting a peak current distribution point and reducing the peak current radiated from the peak current distribution point, wherein the magnitude of electromagnetic radiation emitted from the peak current distribution point in the vicinity of the terminal body is minimized so that the pattern of the emitted electromagnetic waveform adjacent to the terminal is reshaped in such a way so as to reduce the influence of electromagnetic waves upon a user's head.

* * * * *